W. SCHUETZE.
VEHICLE WHEEL.
APPLICATION FILED DEC. 18, 1908.
952,019.
Patented Mar. 15, 1910.
2 SHEETS—SHEET 2.
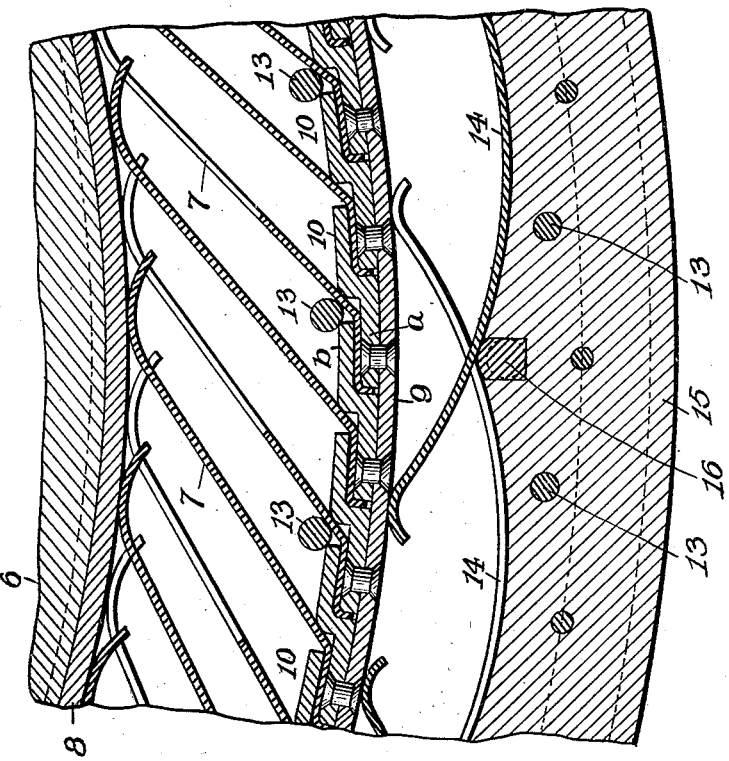
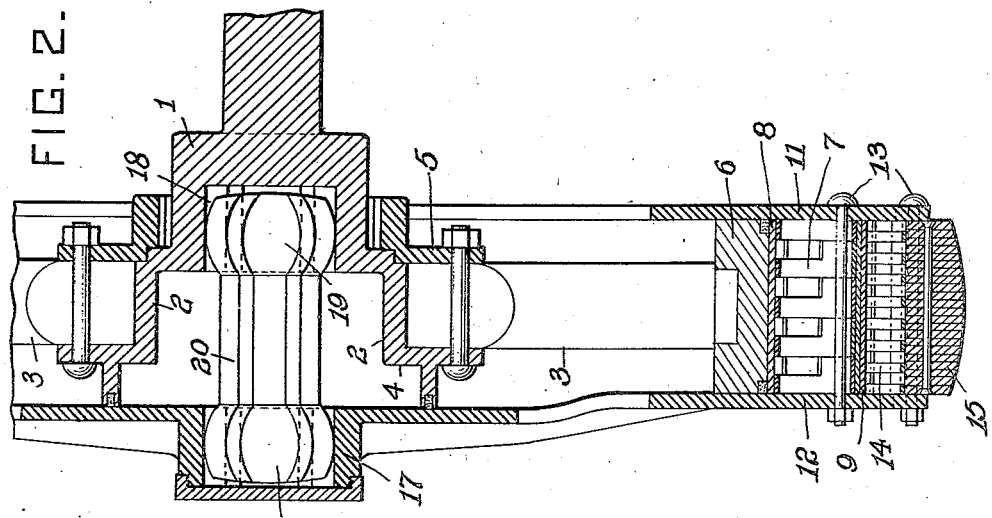
WITNESSES:
INVENTOR
William Schuetze
by Christy and Christy
Atty's

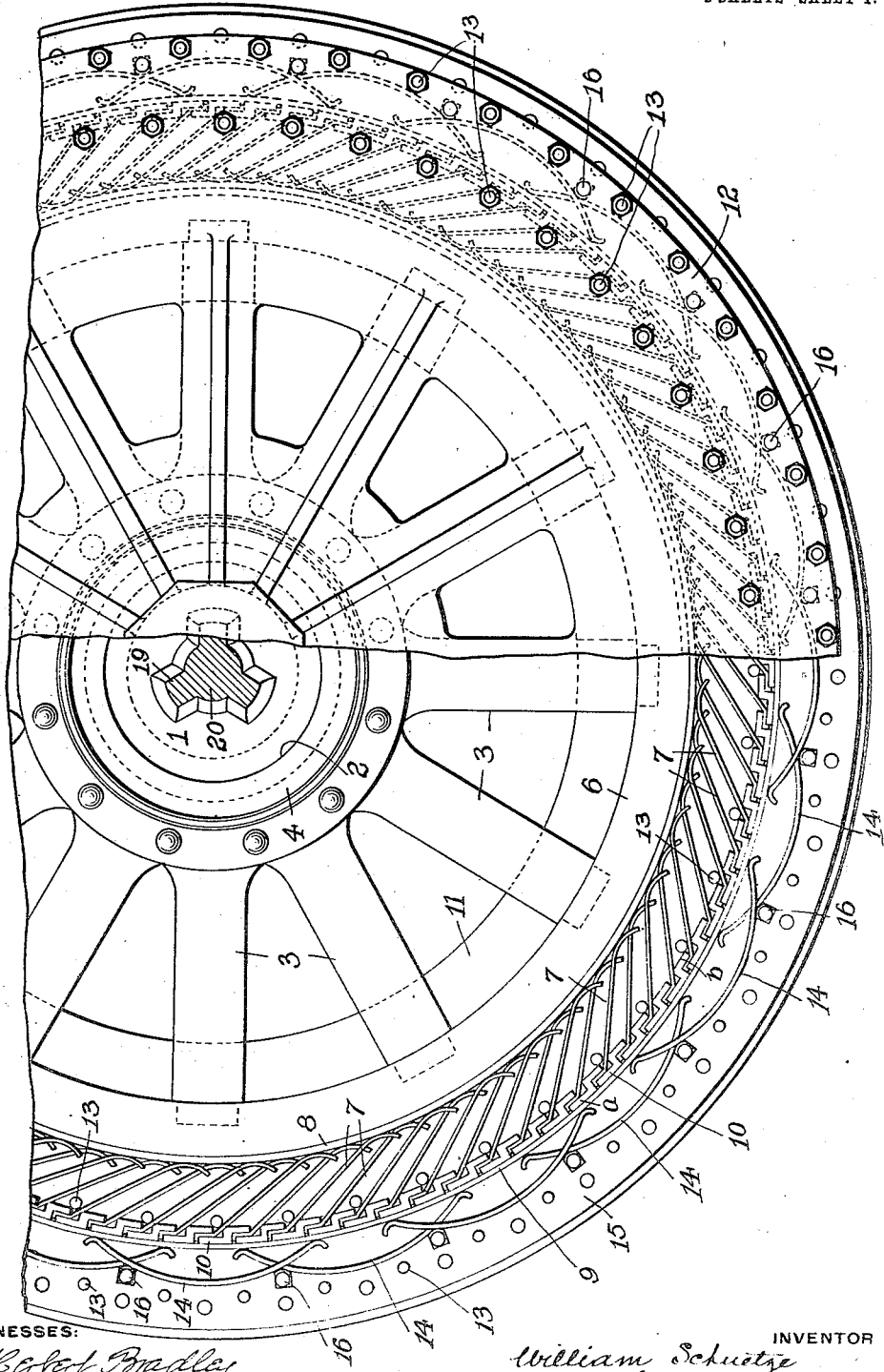

UNITED STATES PATENT OFFICE.

WILLIAM SCHUETZE, OF PITTSBURG, PENNSYLVANIA.

VEHICLE-WHEEL.

952,019.  Specification of Letters Patent.  Patented Mar. 15, 1910.

Application filed December 18, 1908. Serial No. 468,149.

*To all whom it may concern:*

Be it known that I, WILLIAM SCHUETZE, residing at Pittsburg, in the county of Allegheny and State of Pennsylvania, a citizen of the United States, have invented or discovered certain new and useful Improvements in Vehicle-Wheels, of which improvements the following is a specification.

The invention described herein relates to certain improvements in vehicle wheels, and has for its object a construction of vehicle wheel wherein the outer portion of the wheel is permitted to move in planes at an angle to the axis of the hub and axle.

The invention is hereinafter more fully described and claimed.

In the accompanying drawings forming a part of this specification, Figure 1 is a side elevation of a portion of a wheel embodying my improvements with a portion of the outer disk broken away; Fig. 2 is a sectional view of a little more than half of the wheel in a radial plane and Fig. 3 is an enlarged sectional view of a portion of the rim of the wheel.

In the practice of my invention the hub 1 may be formed integral with the shaft for the driving wheels of an automobile. This hub is provided with a shelf or flange 2 for the support of the inner ends of the spokes 3, the latter being maintained in position on one side by a lip 4 formed on the flange 2 and on the other side by an annular plate 5 bolted to the lip 4. The outer ends of the spokes are provided with tenons fitting into suitable sockets in the inner periphery of the felly 6, which as clearly shown forms the bearing for the inner or free ends of the springs 7. It is preferred that a thin metal tire 8 be interposed between the ends of the springs and the felly as a bearing plate for the springs. The outer ends of these springs are secured to a ring 9 in any suitable manner, but preferably by means of shoes 10 which are made similar one to the other, and are constructed in such manner that one portion, as *a*, may be secured to the ring 9, while the opposite end *b* will overlap and bear upon the end of a spring 7 resting upon the part *a* of the preceding shoe. The ends of the springs are bent so as to project in between adjacent shoes and be tightly clamped thereby. As clearly shown in Figs. 2 and 3, the free portions of the spring are cut away so that the tongue of one spring can overlap the preceding spring and be free to move therein, as clearly shown in Fig. 2. The ring 9 having the springs secured thereto, as stated, is held in position laterally by side plates 11 and 12, such plates being clamped on opposite sides of the felly 6 and the spring 9, by bolts 13. The ring 9 also serves as a bearing for bowed springs 14 interposed between the ring 9 and a tire 15 preferably formed of thin sections of leather. At midway of their length the springs will bear against the inner periphery of this tire and additional bearing points are provided by means of bolts 16 having their ends secured in said plates 11 and 12 and their intermediate portions suitably shaped to bear upon the springs where they cross each other, as clearly shown in Fig. 3.

It will be observed that the inner clamping plate 11 is made of such a width that it does not extend materially within the felly 6, whereas the plate 12 is made in the form of a disk and is provided at its center with a socket 17. This socket corresponds to a socket 18 formed in the hub 1 and is made of such an irregular shape that the heads 19 on the transmitting shaft 20 will fit therein and effect a driving or rotation of the disk, rotation being imparted to the driving shaft by the socket 18. These heads are rounded so that a driving relation will be maintained between the hub and the disk even when the disk and the parts carried thereby are shifted so that the axis of the disk will be out of line with the axis of the shaft. The sockets 17 and 18 are formed with pockets or recesses parallel with the axis of the shaft, and the heads 19 have ribs having their outer surfaces curved transversely and longitudinally of the connecting member 20. When the heads are inserted in the sockets the ribs enter the pockets or recesses and by reason of the longitudinal curvature of the ribs, the connecting element can be shifted to a considerable angle to the axis of the hub, while maintaining driving engagement with the sockets.

A wheel having this construction will have the central portion, *i. e.* from the felly inward, driven by the hub while the outer portion *i. e.* the parts beyond or outside of the felly will be driven by the disk 12, so that even when the outer portions are shifted by striking against some obstruction so that the axes of the disk and axle are out of alinement, a driving connection will be maintained and the inner and outer parts of the wheel will rotate in unison.

I claim herein as my invention:

1. A vehicle wheel having in combination an inner portion adapted to be carried by the axle of the vehicle, an outer portion, said portions being movable relative to each other in a driving connection from the inner to the outer portions, such connection having a portion normally in line with the axle, said parts being constructed to permit the movement of the outer portion of the wheel in any direction in a plane substantially at right angles to the axis of rotation.

2. A vehicle wheel having in combination an inner portion adapted to be carried by the axle of the wheel, an outer portion yieldingly supported by the inner portion, but movable independent of the inner portion, a driving connection from the inner to the outer portion, such connection having a portion normally in line with the axle, said parts being constructed to permit the movement of the outer portion of the wheel in any direction in a plane substantially at right angles to the axis of rotation.

3. A vehicle wheel having in combination a hub provided with spokes, a felly secured to the spokes, a rim portion yieldingly supported by the felly, plates secured to the rim and extending on opposite sides of the felly and a universal driving connection from the hub to one of said plates normally in line with the axis of the hub.

4. A vehicle wheel having in combination a hub provided with spokes, a felly secured to the spokes, a rim portion yieldingly supported by the felly, an annular plate secured to the rim and bearing on one side of the felly, a disk provided with a centrally arranged and irregularly shaped socket, and secured to the opposite side of the rim, and a transmitting shaft having heads adapted to engage the socket on the disk and a correspondingly shaped socket in the hub.

In testimony whereof, I have hereunto set my hand.

WILLIAM SCHUETZE.

Witnesses:
   CHARLES BARNETT,
   EDWARD F. MOSER.